(12) United States Patent
Isakiewitsch

(10) Patent No.: US 10,118,649 B2
(45) Date of Patent: Nov. 6, 2018

(54) AUXILIARY FRAME FOR A TWO-TRACK MOTOR VEHICLE

(71) Applicant: AUDI AG, Ingolstadt (DE)

(72) Inventor: Christian Isakiewitsch, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 22 days.

(21) Appl. No.: 15/409,119

(22) Filed: Jan. 18, 2017

(65) Prior Publication Data

US 2017/0210429 A1    Jul. 27, 2017

(30) Foreign Application Priority Data

Jan. 22, 2016  (DE) .................. 10 2016 000 670

(51) Int. Cl.
  B62D 21/11    (2006.01)
  B62D 25/08    (2006.01)

(52) U.S. Cl.
  CPC ............ B62D 25/085 (2013.01); B62D 21/11 (2013.01)

(58) Field of Classification Search
  CPC ............................ B62D 25/085; B62D 21/11
  See application file for complete search history.

(56) References Cited

U.S. PATENT DOCUMENTS

| 5,240,279 | A | 8/1993 | Kunert |
| 6,511,096 | B1 | 1/2003 | Kunert et al. |
| 9,120,506 | B2 | 9/2015 | Isakiewitsch et al. |
| 9,321,323 | B2 | 4/2016 | Schindler et al. |
| 9,434,230 | B2 | 9/2016 | Schmitt et al. |
| 9,434,416 | B2 | 9/2016 | Isakiewitsch et al. |
| 9,446,653 | B2 | 9/2016 | Schindler et al. |
| 2010/0231005 | A1* | 9/2010 | Yoshida .................. B62D 3/12 296/203.02 |
| 2011/0215545 | A1* | 9/2011 | Buschjohann ......... B62D 21/11 280/124.109 |
| 2011/0266785 | A1* | 11/2011 | Mildner ................. B62D 21/11 280/785 |
| 2012/0104739 | A1* | 5/2012 | Buschjohann ..... B22D 19/0072 280/781 |
| 2014/0191105 | A1* | 7/2014 | Dandekar .............. B62D 21/11 248/671 |

(Continued)

FOREIGN PATENT DOCUMENTS

| DE | 41 27 037 A1 | 2/1993 |
| DE | 199 09 945 C1 | 10/2000 |

(Continued)

*Primary Examiner* — Drew J Brown
(74) *Attorney, Agent, or Firm* — Henry M Feiereisen, LLC

(57) ABSTRACT

An auxiliary frame for a front axle of a two-track motor vehicle includes lateral longitudinal members extending in a longitudinal direction of the motor vehicle; front and rear cross members, said lateral longitudinal members converging at respective front and rear corner-joint parts with the front and rear cross members; at least one rear control arm console having console wings, with a rear wheel control arm of a wheel suspension of the motor vehicle being articulately connected between the console wings, one of the console wings having a mounting section; and at least one mount support for supporting an aggregate mount for a drive aggregate of the vehicle, wherein the mount support is formed on the mounting section of the one of the console wings.

19 Claims, 5 Drawing Sheets

(56) References Cited

U.S. PATENT DOCUMENTS

| | | | |
|---|---|---|---|
| 2015/0298741 A1* | 10/2015 | Winberg | B62D 21/155 296/187.09 |
| 2015/0353136 A1* | 12/2015 | Kramer | B62D 21/11 296/204 |
| 2016/0221606 A1* | 8/2016 | Irle | B62D 21/11 |
| 2016/0347369 A1* | 12/2016 | Haselhorst | B60G 21/0551 |

FOREIGN PATENT DOCUMENTS

| | | | | |
|---|---|---|---|---|
| DE | 10 2008 010 553 A1 | 8/2009 | | |
| DE | 10 2011 101 408 A1 | 5/2012 | | |
| JP | 2009096370 A | * | 5/2009 | B62D 3/12 |
| JP | 2017052410 A | * | 3/2017 | B60G 21/0551 |

* cited by examiner

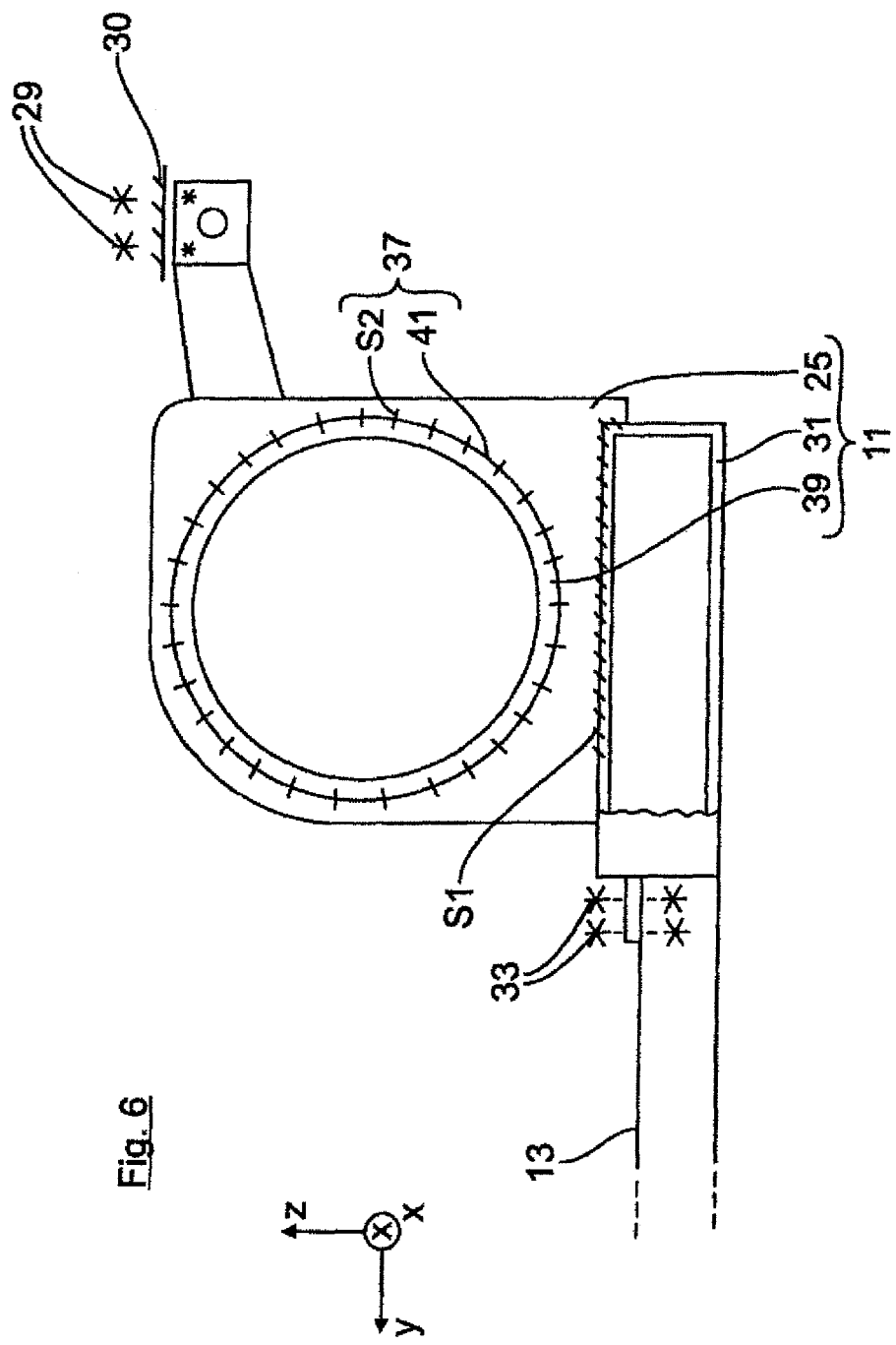

AUXILIARY FRAME FOR A TWO-TRACK MOTOR VEHICLE

CROSS-REFERENCES TO RELATED APPLICATIONS

This application claims the priority of German Patent Application, Serial No. 10 2016 000 670.6, filed Jan. 22, 2016, pursuant to 35 U.S.C. 119(a)-(d), the content of which is incorporated herein by reference in its entirety as if fully set forth herein.

BACKGROUND OF THE INVENTION

The invention relates to an auxiliary frame for a front axle of a two-track motor vehicle.

The following discussion of related art is provided to assist the reader in understanding the advantages of the invention, and is not to be construed as an admission that this related art is prior art to this invention.

The drive aggregate of a vehicle, for example an internal combustion engine or an electric machine, is usually supported in the front region of the vehicle on an auxiliary frame or an axle bracket on the vehicle body via interposition of vibration damping aggregate mounts. The drive aggregate can for example be supported by a three-point or four-point support on the auxiliary frame via front and rear aggregate mounts.

In order to ensure a proper function of the aggregate mounts during driving, i.e., effective vibration damping, it is advantageous when the connection between the mount supports in which the aggregate mounts are installed and the auxiliary frame is as vibration stiff as possible. Therefore the mount supports on the auxiliary frame are mostly constructed using a rather large amount of material in order to provide a stiff connection of the aggregate mounts on the auxiliary frame.

It would therefore be desirable and advantageous to provide an auxiliary frame in which a mount support for an aggregate mount can be easily connected on the auxiliary frame in a vibration stiff manner.

SUMMARY OF THE INVENTION

According to one aspect of the present invention an auxiliary frame for a front axle of a two-track motor vehicle includes lateral longitudinal members extending in a longitudinal direction of the motor vehicle; front and rear cross members, said lateral longitudinal members converging at respective front and rear corner-joint parts with the front and rear cross members; at least one rear control arm console having console wings, with a rear wheel control arm of a wheel suspension of the motor vehicle being articulately connected between the console wings, one of the console wings having a mounting section; and at least one mount support for supporting an aggregate mount for a drive aggregate of the vehicle, wherein the mount support is formed on the mounting section of the one of the console wings.

The invention is based on the recognition that especially the console wings for the rear control arm console of the auxiliary frame are not unconnected, i.e., they do not swing freely, at the end that protrudes from the auxiliary frame, but are rather screwed onto the vehicle body at vehicle-body connection points, for example to the base of an A-column, so as to form a stiff connection. The console wings thus represent a very stiff connection between the auxiliary frame and the vehicle body by means of which crash-related impact forces can be conducted from the auxiliary frame into the vehicle body structure.

According to the invention, the console wing of the rear control arm console therefore has a mounting section on which a mount support for the aggregate mount is formed. In this way a vibration-stiff support basis can be provided for the mount support directly on the console wing of the rear control arm console.

According to another advantageous feature of the invention, the mount support may not be made of the same material as or integrally one-piece with the console wing but can rather be constructed as a guide sleeve separate therefrom, which delimits a bearing eye for the aggregate mount. The aggregate mount can be pressed into the bearing eye of the guide sleeve in a conventional manner. The separate guide sleeve can be materially bonded to a corresponding connection contour of the mounting section in a joining process, preferably by a welding process. The connection contour of the mounting section can surround the outer circumference of the guide sleeve at least partially, in particular continuously, and can be welded with the outer circumference of the guide sleeve in a materially bonding manner.

The auxiliary frame can have a modular construction in which the respective rear corner-joint part can be a separate component on which the longitudinal members and cross members are screwed via screw points. In addition the console wing (configured as a separate component) of the rear control arm console that carries the mount support can be connected to the corner-joint parts. As an alternative the console wing that carries the mount support can also be directly connected on the auxiliary frame longitudinal member.

According to another advantageous feature of the invention, the rear corner-joint part can be a pre-assembled unit, preferably a welding group, in which a base body is materially bonded with at least one of the console wings, in particular with the console wing that carries the mount support. The base body and the console wing that carries the mount support can each be configured as formed sheet metal part in a sheet metal sheet construction which have a lower component weight compared to corresponding injection molded parts. Likewise also the longitudinal members and cross members can be configured as formed sheet metal part (for example as IHU-profile). In this case the connection contour of the mounting section to which the mount support can be connected, can be realized as a cutting edge which delimits a hole in the respective formed sheet metal part and is welded to the mount support.

As mentioned above the rear corner-joint parts can be configured as a welding group. On the welding group preferably the auxiliary frame cross member, the auxiliary frame longitudinal member, a flat stiffening element and also the vehicle body can be connected in a force fitting or materially bonding manner. The flat stiffening element can form a shear panel by means of which, for example in the event of a front collision with small lateral overlap, the impact forces can be transmitted from the crash-facing auxiliary frame side to the diagonally opposite crash-averted auxiliary frame side.

According to another advantageous feature of the invention, not only the console wing that carries the mount support but both console wings of the rear control arm console are configured as separate formed sheet metal parts, which are welded or bonded with the base body of the corner-joint parts.

For further stiffening of the support basis provided for the mount support the longitudinal members and cross members and the two console wings of the rear control arm console can converge star-like at the base body of the rear corner-joint part.

According to another advantageous feature of the invention, for providing further stiffening, the rear corner-joint part can have a multi-layered construction in which the guide sleeve is positioned on the base body of the corner-joint part with interposition of the console wing when viewed in vertical direction of the vehicle, in particular with the guide sleeve and the console wing being aligned with each other. The guide sleeve, the console wing and the base body are connected in a materially bonding manner with each other so as to form the above mentioned welding group, i.e., they are welded with each other.

BRIEF DESCRIPTION OF THE DRAWING

Other features and advantages of the present invention will be more readily apparent upon reading the following description of currently preferred exemplified embodiments of the invention with reference to the accompanying drawing, in which

FIG. 6 shows in a view according to FIG. 4 a sectional view of the auxiliary frame of the second exemplary embodiment.

DETAILED DESCRIPTION OF PREFERRED EMBODIMENTS

Figure 1:
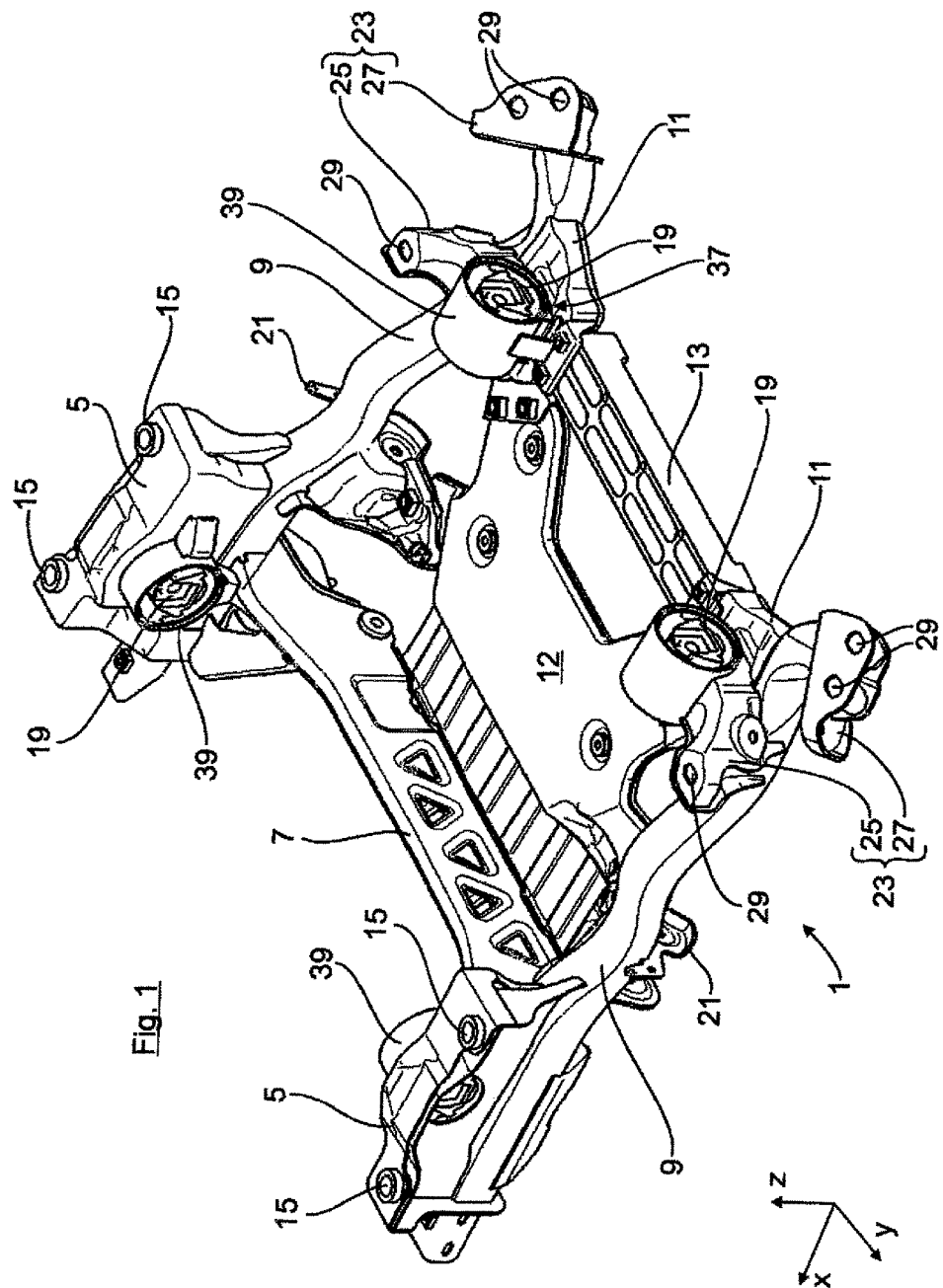
FIG. 1 shows a perspective view of an auxiliary frame for a front region of a motor vehicle according to a first exemplary embodiment.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows individually an auxiliary frame 1 on which a not shown drive aggregate of the vehicle can be supported in a four-point support. In FIG. 1 the auxiliary frame 1 has two front lateral corner-joint parts 5, which are connected with each other via an auxiliary frame cross member 7. The two front corner-joint parts 5 are extended rearward in the vehicle longitudinal direction x via lateral auxiliary-longitudinal members 9 which at the rear corner-joint parts 11 converge with a rear auxiliary frame cross member 13. In the assembled state the two front corner-joint parts 5 of the auxiliary frame 1 are connected at screw points 15 with not shown vehicle body longitudinal members. As can be further seen from FIG. 1 respective aggregate mounts 19 are provided at the front and also at the rear corner-joint parts 5, 11 which aggregate mounts support the drive aggregate with interposition of not shown aggregate supports, i.e., so as to form a four-point support on the auxiliary frame 1.

Figure 4:
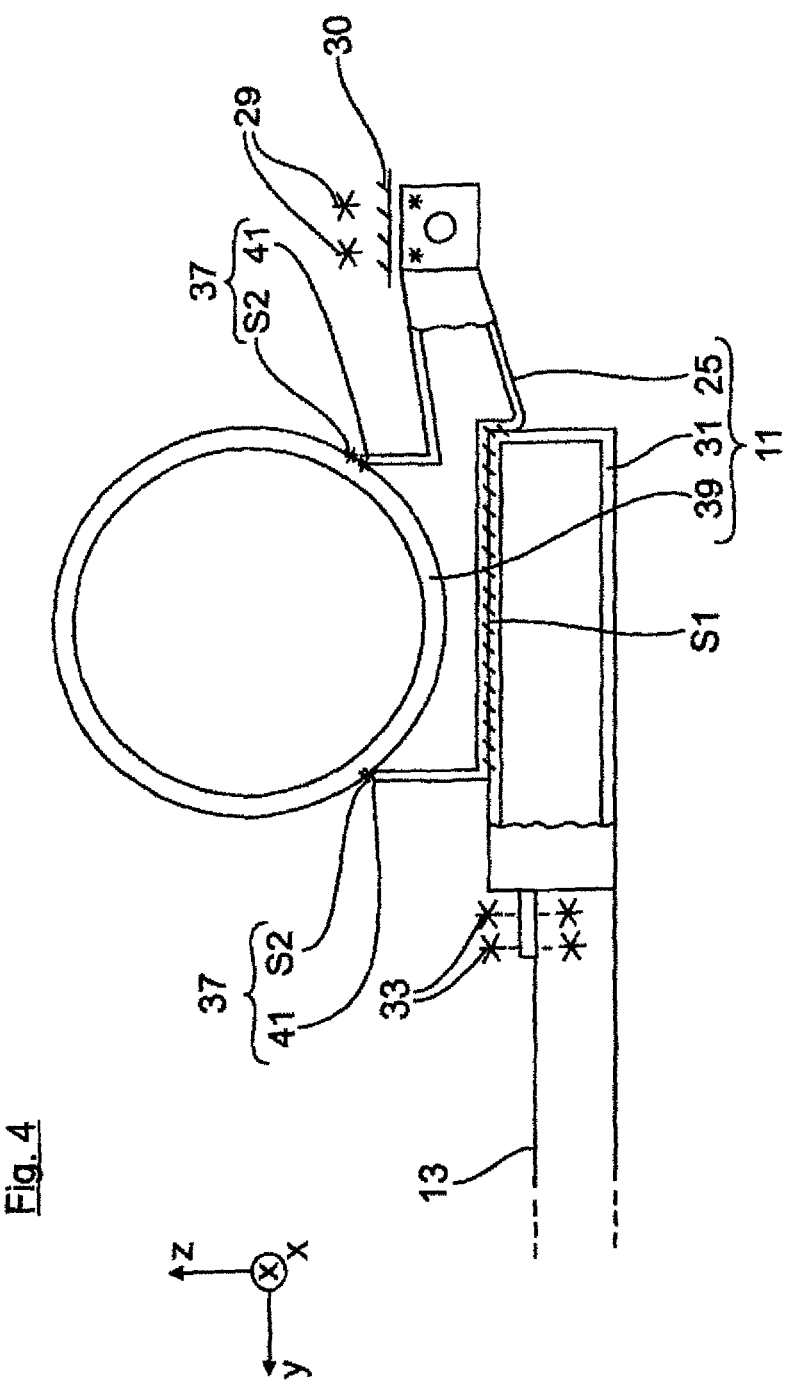
FIG. 4 shows a schematic sectional view of the auxiliary frame in the region of the aggregate mount.

The auxiliary frame 1 also has a respective lateral control arm console 21, 23 on either side on which not shown wheel control arms, which are a part of a wheel suspension of the motor vehicle, can be pivotally connected. Via its two console wings 25, 27 the respective rear control arm console 23 of the shown control arm consoles 21, 23 forms a direct component of the rear corner-joint parts 11. In the assembled state the two console wings 25, 27 of the rear control arm console 23 are not free at their lateral ends that protrude from the auxiliary frame 1 but are rather provided with vehicle body connection points 29, via which the auxiliary frame can be connected on the vehicle body 30 (FIG. 4 or 6). In addition a flat stiffening element 12 extends between the longitudinal members and cross members 7, 9, 13 of the auxiliary frame 1, which is connected at the front on the front corner-joint parts 5 and at the rear on the rear corner-joint parts 11.

Figure 2:
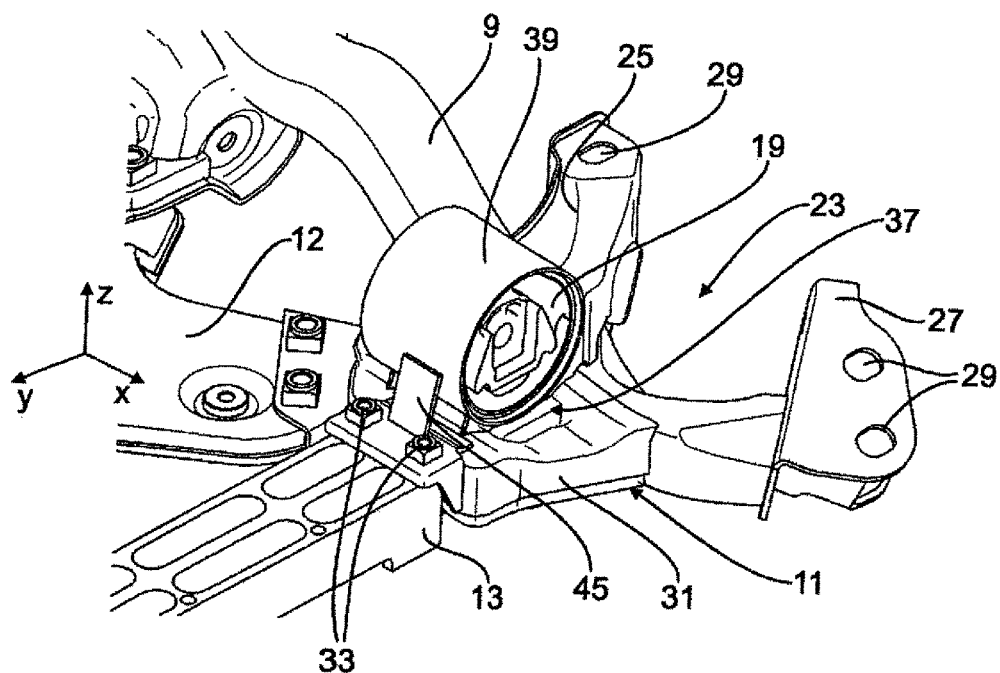
FIG. 2 an enlarged perspective partial view of a rear aggregate mount, whose mount support is formed at a console wing of a rear control arm console.

In the shown exemplary embodiment the auxiliary frame 1 is constructed as a sheet metal shell construction. In the following specifically the construction of the auxiliary frame 1 in the region of the rear corner-joint part 11 is described: Thus the rear corner-joint part 11 is not configured as a cast joint part but rather as a welding group in which according to FIG. 2 or 4 a corner-joint part base body 31 is held with the two console wings 25, 27 of the rear control arm console 23. The corner-joint part base body 31 and also the two console wings 25, 27 are configured as separate formed sheet metal parts, which are welded to each other.

Figure 3:
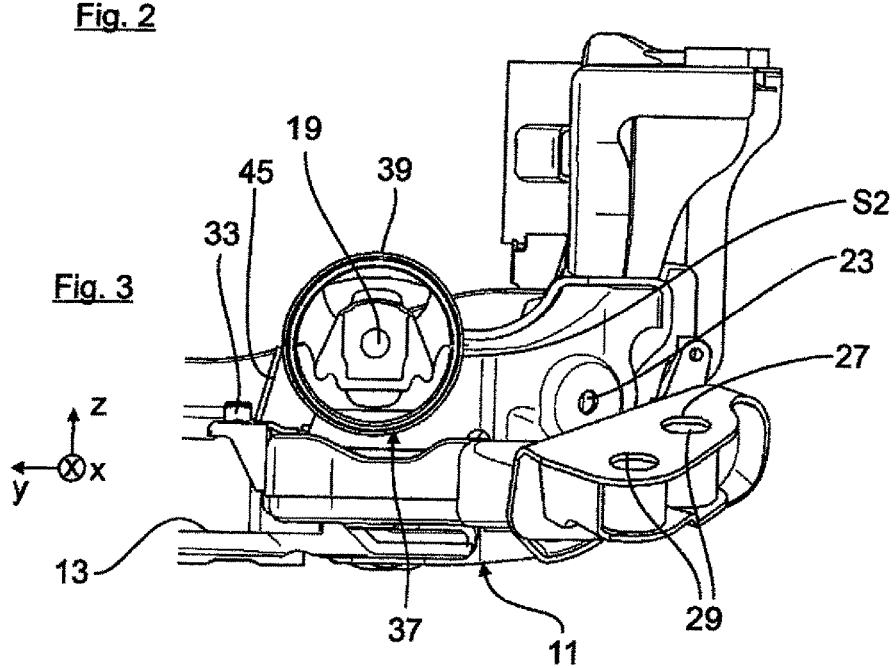
FIG. 3 shows a partial view of the rear aggregate mount.

FIG. 4 shows a schematic sectional view of the basic construction of the welding group that forms the rear corner-joint parts 11: accordingly in FIG. 4 the welding group is constructed as a multilayered construction, i.e., when viewed in vertical direction z of the vehicle with the lower corner-joint part-base body 31, on which via indicated screw points 33 the rear auxiliary frame cross member 13 is screwed. The front console wing 25 of the rear control arm console 2 is welded at a first welding connection point S1 to the corner-joint parts-base body 31. In the further course of the vehicle vertical direction z upwards the console wing 25 has on its topside a mounting section 37, which carries a mount support 39 of the rear aggregate mount 19. In FIG. 4 the mounting section 37 is configured with a cutting edge 41, which delimits a hole in the topside of the console wing 21, which is configured as formed sheet metal part. In the Figures the mount support 39 is a separate guide sleeve, which with its outer circumference rests in line contact on the cutting edge 41 of the mounting section 37 and is welded at a second welding connection site S2 to the cutting edge 41. In order to increase the connection stiffness between the mount support 39 and the auxiliary frame sheet metal shell construction a sheet metal strut 45 is additionally provided in FIGS. 1 to 3 which is supported between the corner-joint part base body 31 and the outer circumference of the mount support 39.

Figure 5:
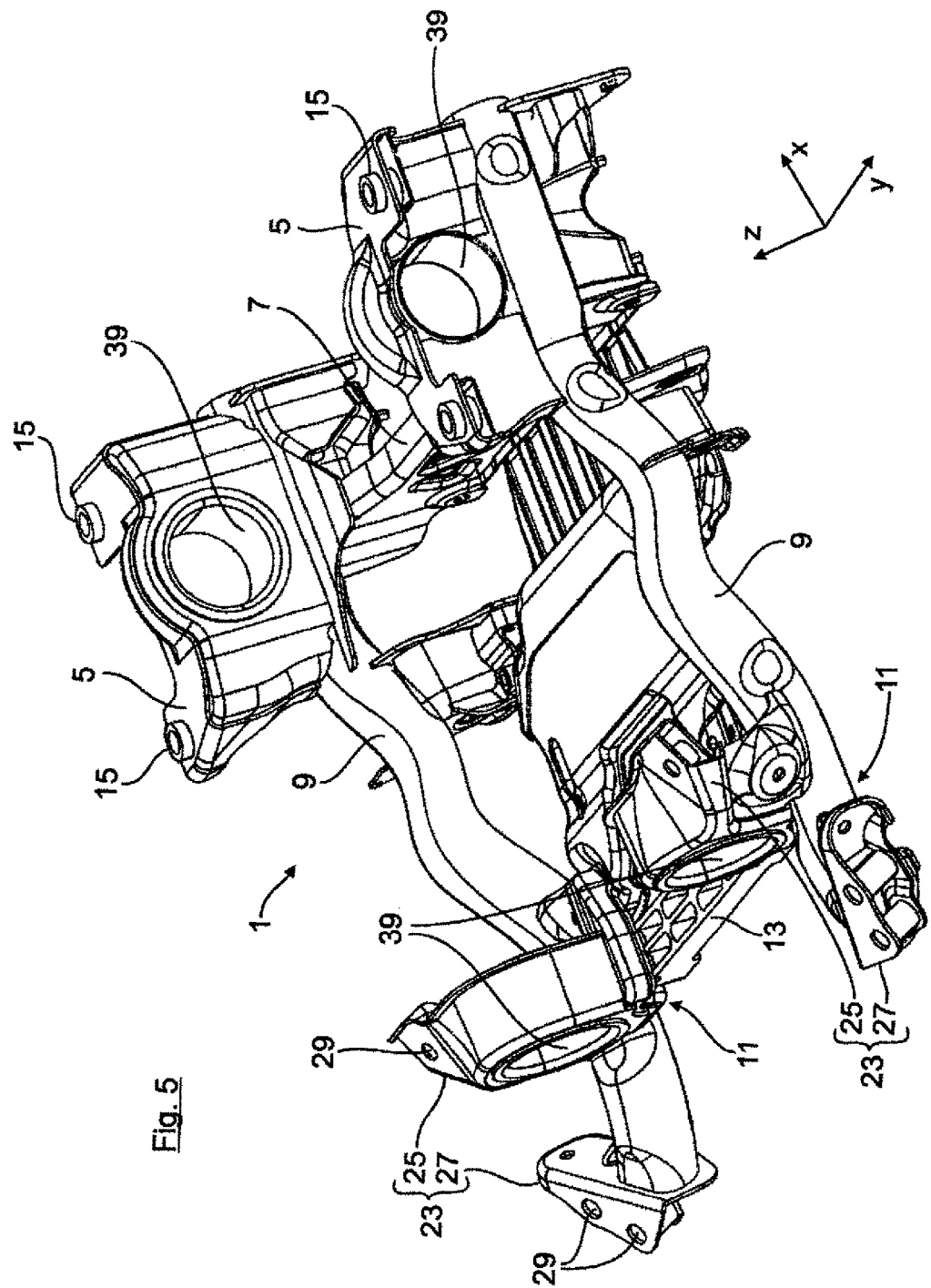
FIG. 5 shows a perspective view of an auxiliary frame for a front region of a motor vehicle according to a second exemplary embodiment.

FIG. 5 shows an auxiliary frame 1 according to a further exemplary variant whose general construction is identical with the auxiliary frame 1 shown in FIGS. 1 to 4, with the exception of the geometry of the rear corner-joint parts 11. In contrast to FIGS. 1 to 4, in FIG. 5 the mounting section 37 of the console wing 25 of the rear corner-joint part 11 is configured hollow-cylindrical. In the hollow-cylindrical mounting section 37 the mount support 39 (guide sleeve) for the aggregate mount 19 is inserted. As a consequence in FIG.

5 the mounting section 37 does not only surround a part of the circumference of the mount support but rather continuously the entire circumference of the mount support.

FIG. 6 shows a simplified illustration of one of the rear corner-joint parts 11 shown in FIG. 5 to facilitate understanding of the invention. Accordingly in FIG. 6 the welding connection site S2 extends circumferentially continuously between the inner circumference of the mounting section 37 and the outer circumference of the mount support, which results in a closed circular line contact between the outer circumference mount support and the hollow cylindrical mounting section 37.

What is claimed as new and desired to be protected by Letters Patent is set forth in the appended claims and includes equivalents of the elements recited therein:

1. An auxiliary frame for a front axle of a two-track motor vehicle comprising:
    lateral longitudinal members extending in a longitudinal direction of the motor vehicle;
    front and rear cross members, said lateral longitudinal members converging at respective front and rear corner-joint parts with the front and rear cross members;
    at least one rear control arm console having console wings, with a rear wheel control arm of a wheel suspension of the motor vehicle being articulately connected between the console wings, one of said console wings having a mounting section; and
    at least one mount support formed as a guide sleeve for supporting an aggregate mount for a drive aggregate of the vehicle, said mount support being formed on the mounting section of the one of the console wings.

2. The auxiliary frame of claim 1, wherein the rear corner-joint parts are configured as a respective welding group, and wherein the cross member, the longitudinal member, a flat stiffening element and the vehicle body are connected on the welding group.

3. The auxiliary frame of claim 2, wherein the cross member, the longitudinal member, the flat stiffening element and the vehicle body are connected on the welding group with a force fitting or material bonding connection.

4. The auxiliary frame of claim 1, wherein the mount support is constructed as a guide sleeve which is providable as a separate component, and which delimits a bearing eye for the aggregate mount.

5. The auxiliary frame of claim 1, wherein the mounting section has a connection contour, which partially encloses an outer circumference of the mount support and is connected with the mount support in a materially bonding manner.

6. The auxiliary frame of claim 5, wherein the connection contour is a cutting edge which delimits a hole in the respective formed sheet metal part.

7. The auxiliary frame of claim 1, wherein the mounting section has a connection contour, which continuously encloses an outer circumference of the mount support and is connected with the mount support in a materially bonding manner.

8. The auxiliary frame of claim 1, wherein the corner-joint parts each have a respective base body, which is connected with at least one of the console wings of a respective one of the corner-joint parts in a materially bonding manner.

9. The auxiliary frame of claim 8, wherein the at least one console wing is provided as a separate component and is connected with the base body in a materially bonding manner.

10. The auxiliary frame of claim 8, wherein the base body and the console wing are respective formed sheet metal parts.

11. The auxiliary frame of claim 8, wherein the console wings of the rear control arm console are connected with the base body as separate components in a materially bonding manner.

12. The auxiliary frame of claim 11, wherein the console wings of the rear control arm console are formed sheet metal parts.

13. The auxiliary frame of claim 8, wherein the longitudinal member, the rear cross member, a flat stiffening element and the at least one console wing of the rear control arm console converge star-like at the base body.

14. An auxiliary frame for a front axle of a two-track motor vehicle comprising:
    lateral longitudinal members extending in a longitudinal direction of the motor vehicle;
    front and rear cross members, said lateral longitudinal members converging at respective front and rear corner-joint parts with the front and rear cross members;
    at least one rear control arm console having console wings, with a rear wheel control arm of a wheel suspension of the motor vehicle being articulately connected between the console wings, one of said console wings having a mounting section; and
    at least one mount support for supporting an aggregate mount for a drive aggregate of the vehicle, said mount support being formed on the mounting section of the one of the console wings,
    wherein the one of the console wings of the rear control arm console has an end that protrudes from the auxiliary frame, said end being provided with a vehicle body connection point at which the one of the console wings is connectable to the vehicle body.

15. The auxiliary frame of claim 14, wherein the mounting section is configured hollow cylindrically, said mount support being insertable into the hollow cylindrical mounting section.

16. The auxiliary frame of claim 15, wherein the mount support is weldable to the mount support being weldable to the hollow cylindrical mounting section.

17. An auxiliary frame for a front axle of a two track motor vehicle comprising:
    lateral longitudinal members extending in a longitudinal direction of the motor vehicle;
    front and rear cross members, said lateral longitudinal members converging at respective front and rear corner-joint parts with the front and rear cross members;
    at least one rear control arm console having console wings, with a rear wheel control arm of a wheel suspension of the motor vehicle being articulately connected between the console wings, one of said console wings having a mounting section; and
    at least one mount support for supporting an aggregate mount for a drive aggregate of the vehicle, said mount support being formed on the mounting section of the one of the console wings,
    wherein the rear corner-joint parts are separate components on which the longitudinal members and cross members and the one of the console wings of the rear control arm console are connected.

18. An auxiliary frame for a front axle of a two-track motor vehicle comprising:
    lateral longitudinal members extending in a longitudinal direction of the motor vehicle;
    front and rear cross members, said lateral longitudinal members converging at respective front and rear corner-joint parts with the front and rear cross members;

at least one rear control arm console having console wings, with a rear wheel control arm of a wheel suspension of the motor vehicle being articulately connected between the console wings, one of said console wings having a mounting section; and at least one mount support for supporting an aggregate mount for a drive aggregate of the vehicle, said mount support being formed on the mounting section of the one of the console wings, wherein the corner-joint parts each have a respective base body, which is connected with at least one of the console wings of a respective one of the corner-joint parts in a materially bonding manner, and wherein the rear corner-joint parts have a multilayered construction in which the mount support, the one of the console wings of the rear control arm console and the base body are arranged above one another other in a vertical direction of the motor vehicle.

19. The auxiliary frame of claim 18, wherein the one of the console wings of the rear control arm console and the base body are aligned with each other in the vertical direction of the motor vehicle.

\* \* \* \* \*